United States Patent
Nakagawa

(10) Patent No.: US 10,994,631 B2
(45) Date of Patent: May 4, 2021

(54) VEHICLE POWER SUPPLY APPARATUS

(71) Applicant: SUBARU CORPORATION, Tokyo (JP)

(72) Inventor: Isao Nakagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 4 days.

(21) Appl. No.: 16/692,878

(22) Filed: Nov. 22, 2019

(65) Prior Publication Data

US 2020/0290478 A1 Sep. 17, 2020

(30) Foreign Application Priority Data

Mar. 14, 2019 (JP) .............................. JP2019-047381

(51) Int. Cl.
*B60L 58/10* (2019.01)
*H02J 7/00* (2006.01)
*B60L 53/80* (2019.01)
*B60L 50/64* (2019.01)

(52) U.S. Cl.
CPC .............. *B60L 58/10* (2019.02); *B60L 50/64* (2019.02); *B60L 53/80* (2019.02); *H02J 7/007* (2013.01); *H02J 7/0068* (2013.01)

(58) Field of Classification Search
CPC .......... B60L 58/10; B60L 50/64; B60L 53/80; H02J 7/0068; H02J 7/007; H02J 7/00
See application file for complete search history.

(56) References Cited

U.S. PATENT DOCUMENTS 5,635,804 A 6/1997 Tanaka et al.

FOREIGN PATENT DOCUMENTS

| JP | H04-145808 A | 5/1992 |
| JP | H08-107601 A | 4/1996 |
| JP | H10-164709 A | 6/1998 |
| JP | 2006-224772 A | 8/2006 |
| JP | 2006-246569 A | 9/2006 |

*Primary Examiner* — Robert L Deberadinis
(74) *Attorney, Agent, or Firm* — McGinn IP Law Group, PLLC

(57) ABSTRACT

A vehicle power supply apparatus includes a battery, a power supply line, a power control unit coupled to the battery via the power supply line, a first main switch provided on a positive power supply line, a second main switch provided on a negative power supply line, a precharge resistor and a resistor switch coupled together in series on a bypass line that bypasses the positive power supply line and the negative power supply line, and a service plug to be brought into either one of a power supply state in which electric power is supplied from the battery to the power control unit and an interrupted state in which the supply of the electric power is interrupted. When the service plug is brought into the interrupted state, the resistor switch is brought into conduction to cause a current to flow from the battery to the precharge resistor.

19 Claims, 11 Drawing Sheets

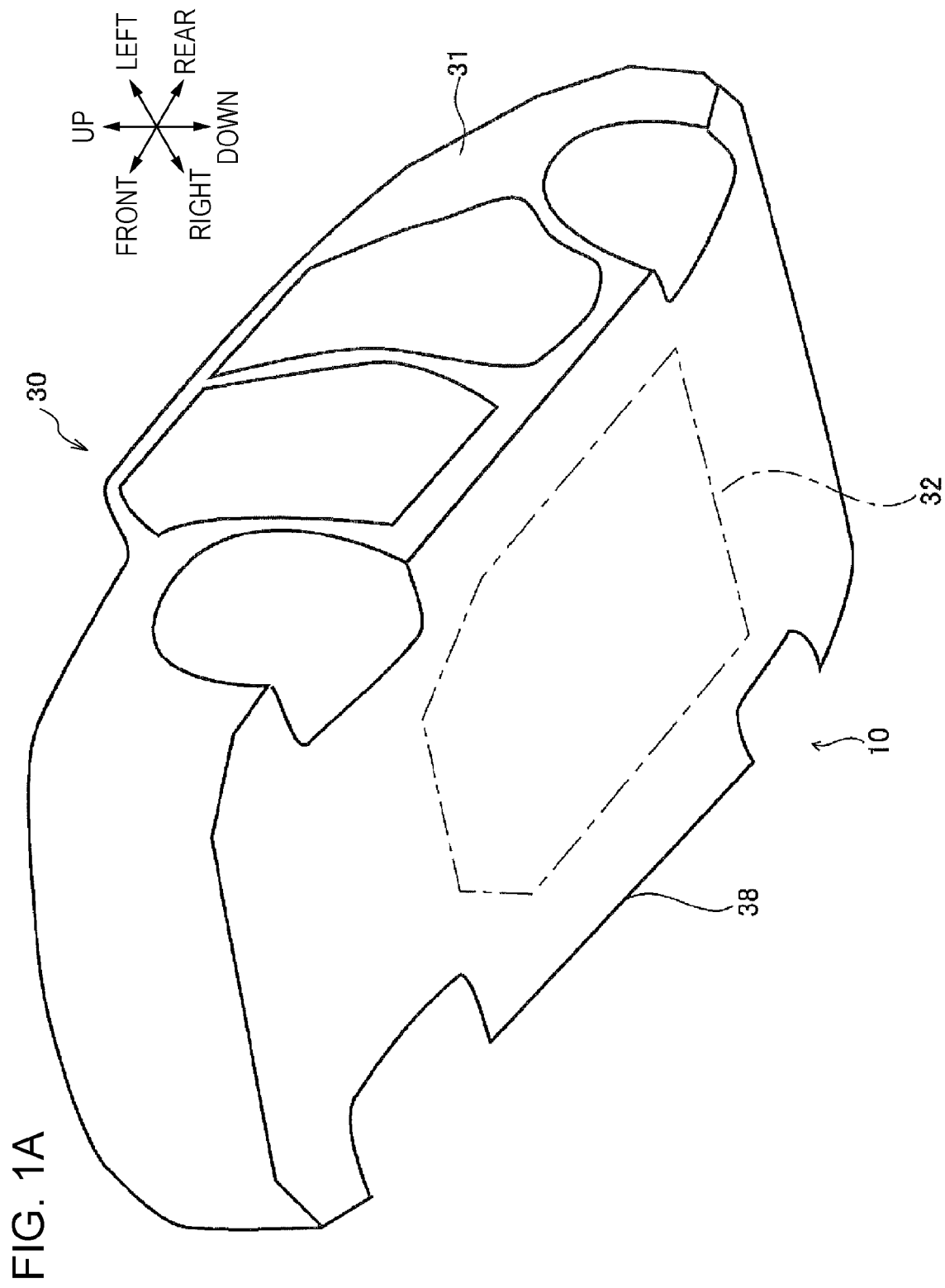

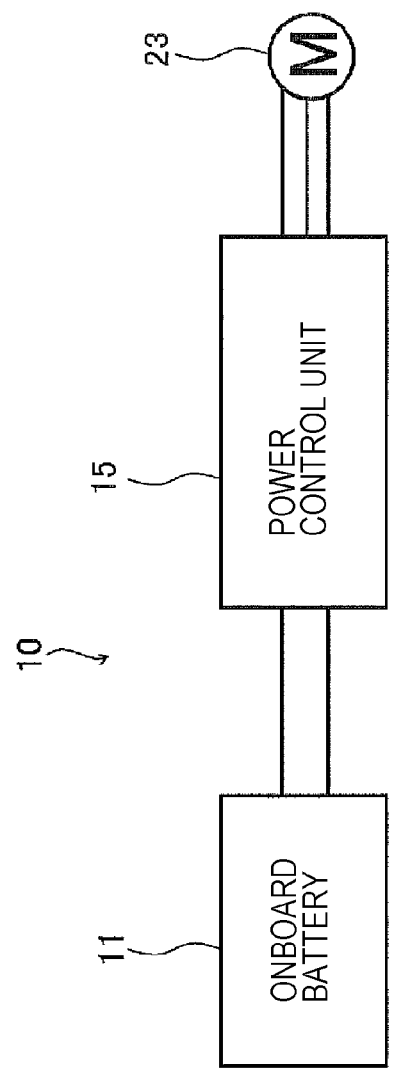

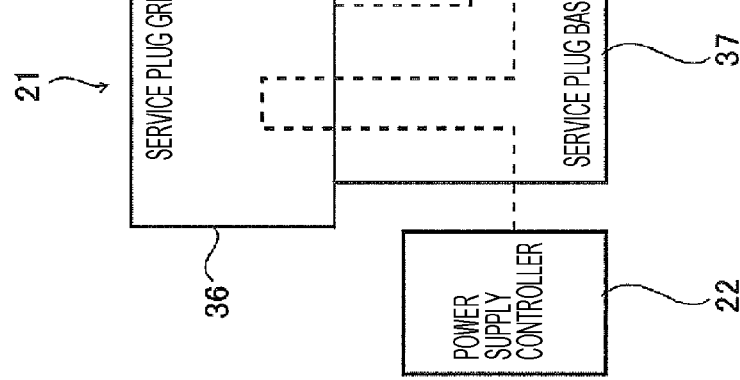
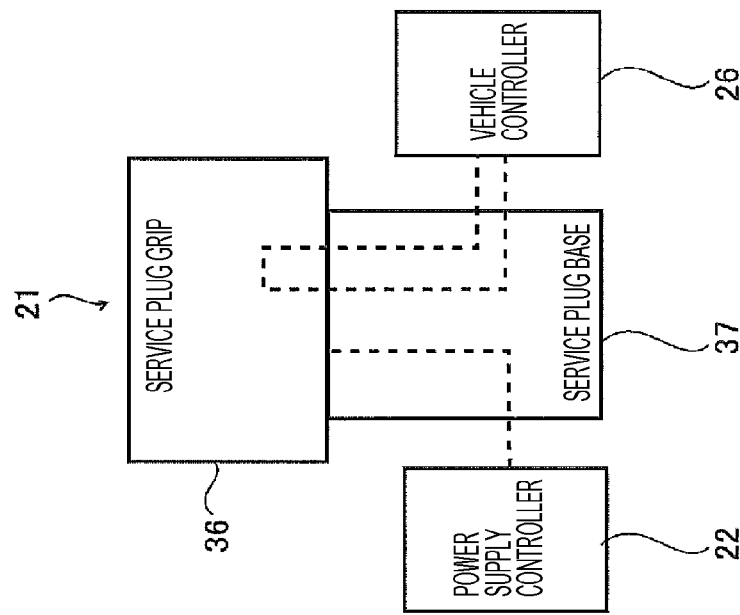

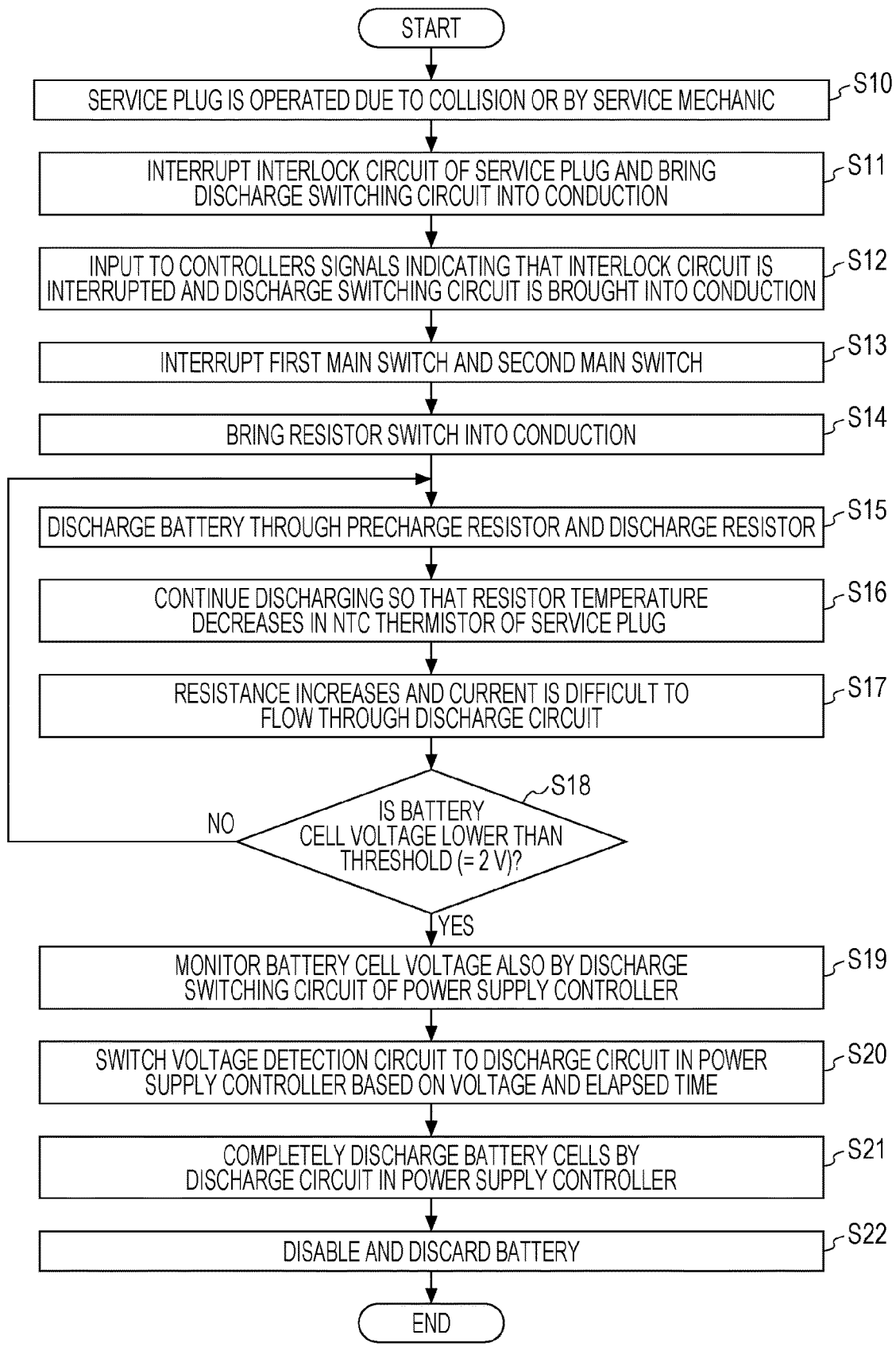

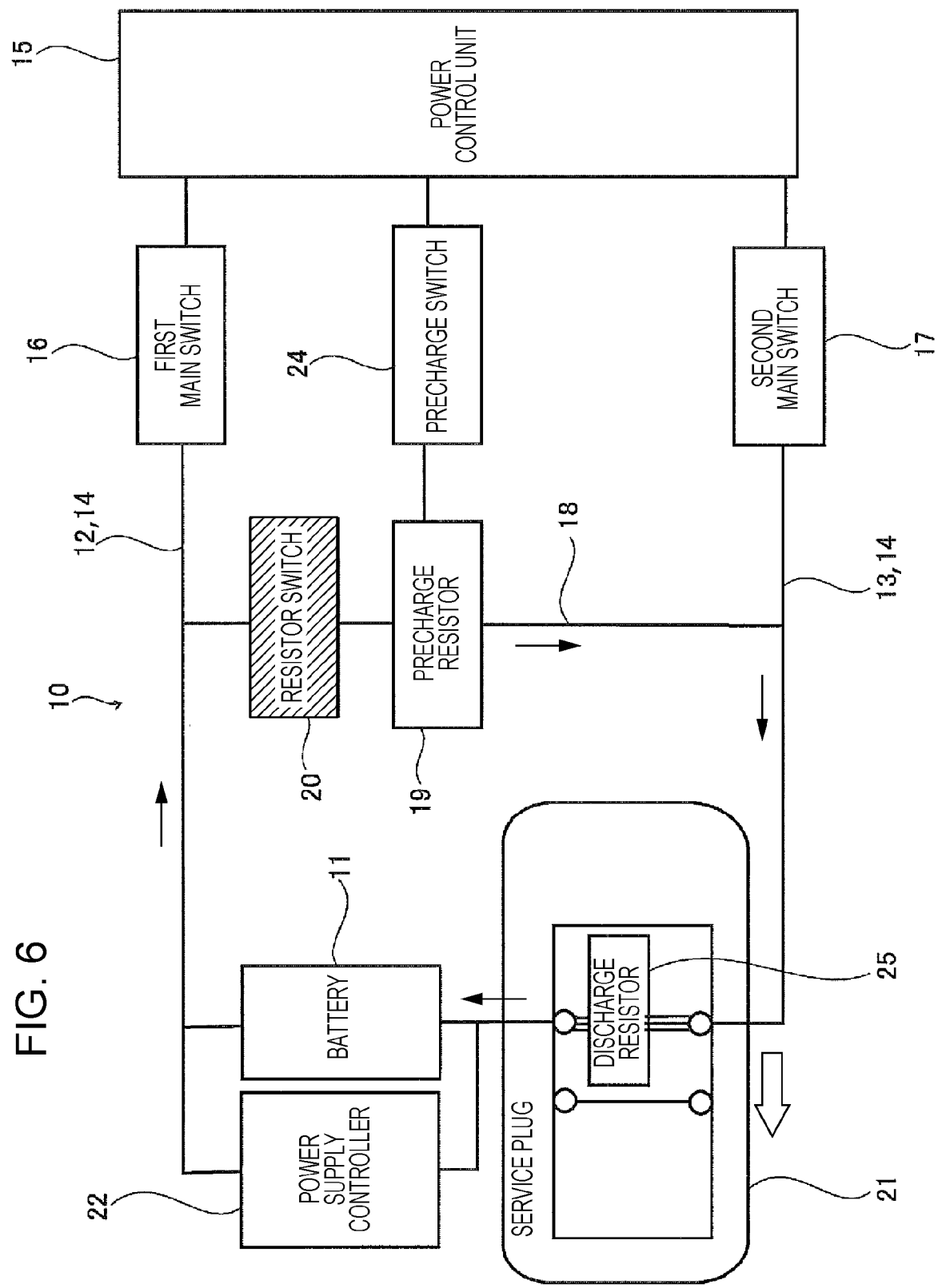

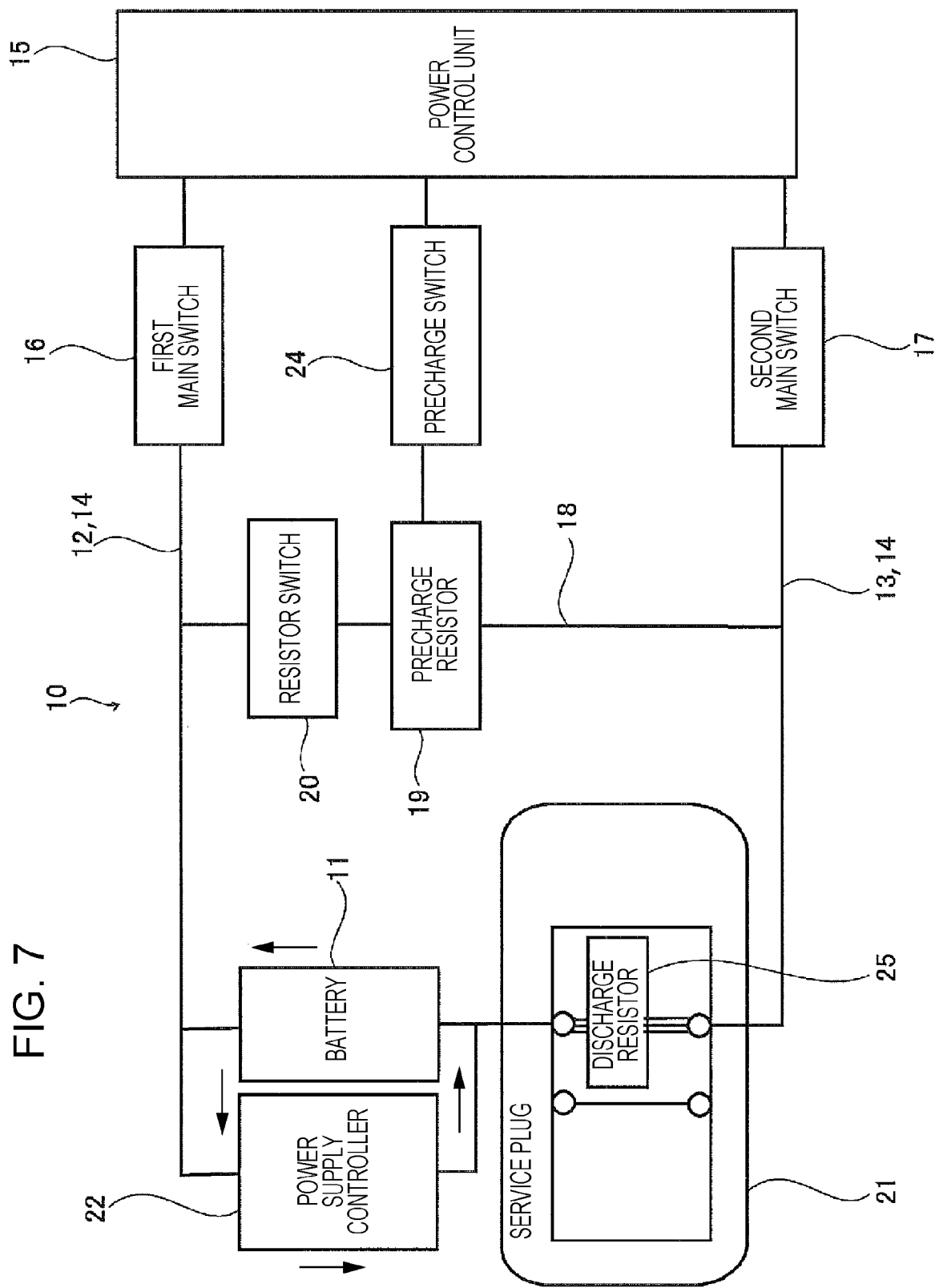

VEHICLE POWER SUPPLY APPARATUS

CROSS-REFERENCE TO RELATED APPLICATIONS

The present application claims priority from Japanese Patent Application No. 2019-047381 filed on Mar. 14, 2019, the entire contents of which are hereby incorporated by reference.

BACKGROUND

The disclosure relates to a vehicle power supply apparatus, and more particularly, to a vehicle power supply apparatus capable of discharging a battery effectively when the battery is discarded or when an accident has occurred.

Hybrid vehicles and electric vehicles have appeared as vehicles such as passenger cars. Those vehicles have large batteries. The structures of the batteries are described in, for example, Japanese Unexamined Patent Application Publication (JP-A) No. 10-164709, JP-A No. 8-107601, JP-A No. 4-145808, JP-A No. 2006-224772, and JP-A No. 2006-246569.

When a vehicle is abandoned and its battery is discarded, the battery may be discharged in accordance with regulations for environmental protection and safety. In general, the battery is demounted from the vehicle, coupled to a discharge apparatus, and discharged by absorbing electric power of the battery with a load of the discharge apparatus until the battery voltage becomes equal to or lower than a predetermined voltage.

When a hybrid or electric vehicle comes into collision, the battery may be discharged to protect occupants and persons who rescue the occupants from an electric shock.

SUMMARY

An aspect of the disclosure provides a vehicle power supply apparatus including a battery, a power supply line, a power control unit, a first main switch, a second main switch, a precharge resistor, a resistor switch, and a service plug. The power supply line includes a positive power supply line and a negative power supply line. The power control unit is coupled to the battery via the power supply line. The first main switch is disposed on the positive power supply line. The second main switch is disposed on the negative power supply line. The precharge resistor and the resistor switch are coupled together in series on a bypass line that bypasses the positive power supply line and the negative power supply line. The service plug is disposed on the power supply line and to be brought into either one of a power supply state in which electric power is supplied from the battery to the power control unit and an interrupted state in which the supply of the electric power is interrupted. When the service plug is brought into the interrupted state, the resistor switch is brought into conduction to cause a current to flow from the battery to the precharge resistor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIGS. 1A and 1B are diagrams illustrating a vehicle power supply apparatus according to an embodiment of the disclosure, in which FIG. 1A is a perspective view illustrating a vehicle including the vehicle power supply apparatus and FIG. 1B is a block diagram illustrating the vehicle power supply apparatus;

FIGS. 3A, 3B, and 3C are diagrams illustrating the vehicle power supply apparatus according to the embodiment of the disclosure, in which FIG. 3A is a block diagram illustrating a coupling structure of a power supply controller and the like and FIGS. 3B and 3C are schematic diagrams illustrating the structures of a service plug;

FIG. 4 is a flowchart illustrating a method for discharging a battery by using the vehicle power supply apparatus according to the embodiment of the disclosure;

FIG. 6 is a circuit diagram illustrating a discharging state in the vehicle power supply apparatus according to the embodiment of the disclosure;

FIG. 7 is a circuit diagram illustrating another discharging state in the vehicle power supply apparatus according to the embodiment of the disclosure; and FIGS. 8A, 8B, and 8C are diagrams illustrating the vehicle power supply apparatus according to the embodiment of the disclosure, in which FIGS. 8A and 8B are schematic diagrams illustrating the structures of a battery pack and the service plug and FIG. 8C is a side view illustrating the vehicle in the event of collision.

DETAILED DESCRIPTION

Figure 2:
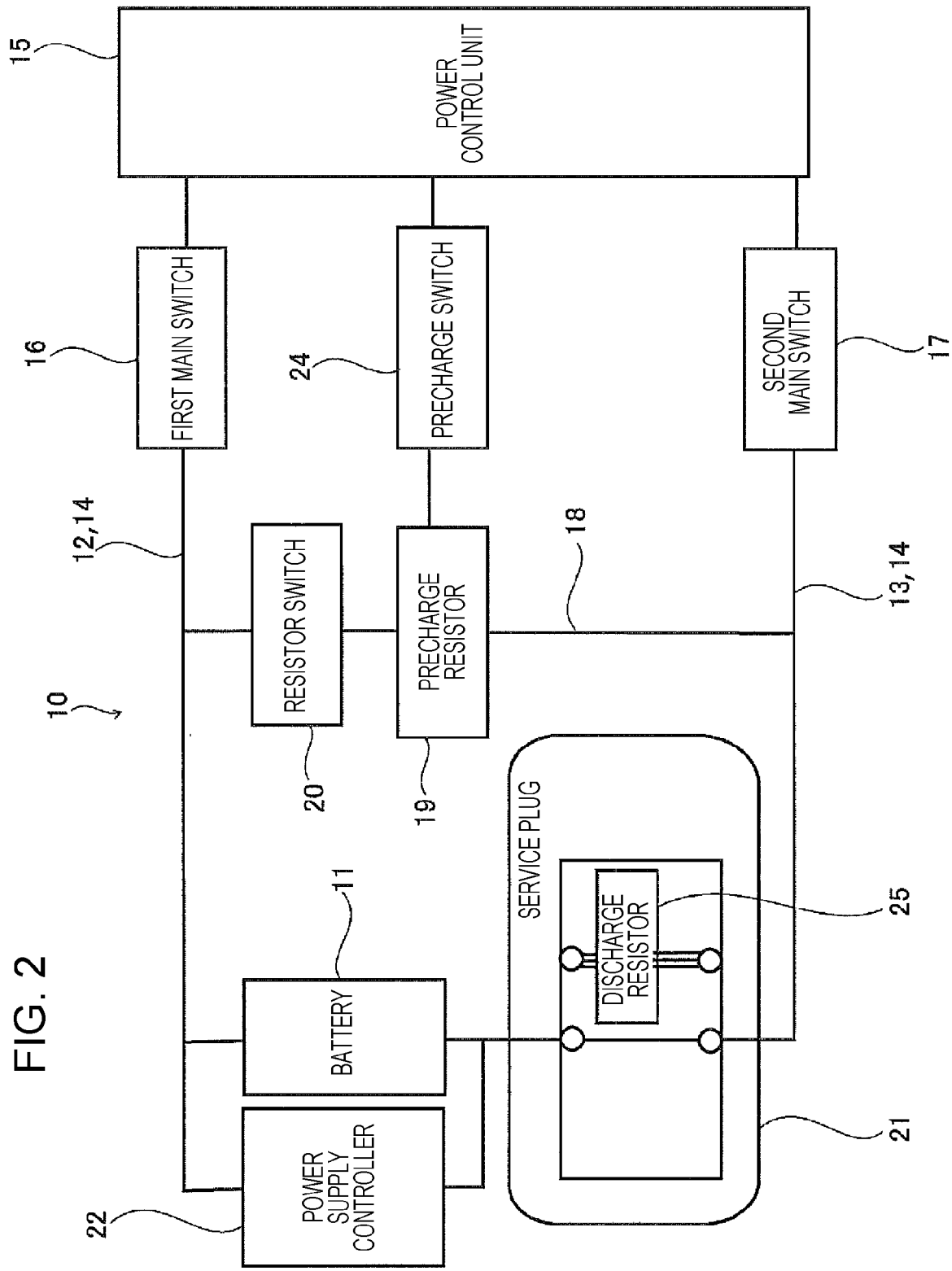
FIG. 2 is a circuit diagram illustrating the vehicle power supply apparatus according to the embodiment of the disclosure.

In a car maintenance shop, it is burdensome to demount a battery from a vehicle and couple the battery to a discharge apparatus because the battery weighing several hundreds of kilograms is moved. Therefore, it is difficult to improve work efficiency.

If a dedicated discharge apparatus is used for disabling the battery, introduction, maintenance, and management of the discharge apparatus produce costs. Therefore, costs increase for abandonment of the vehicle.

The battery voltage can be reduced by coupling the battery to the discharge apparatus but the load of the discharge apparatus has a relatively high resistance value. Therefore, it is difficult to completely disable the battery.

In the event of collision, the battery may be disabled by carrying the discharge apparatus into the site. However, this battery disabling work is not practical in consideration of a rescue operation in the event of accident.

It is desirable to provide a vehicle power supply apparatus capable of discharging a battery with a simple structure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1A is a perspective view illustrating a vehicle 30 including the vehicle power supply apparatus 10. FIG. 1B is a block diagram illustrating a coupling structure of the vehicle 30.

As illustrated in FIG. 1A, the vehicle 30 such as an automobile or a train includes the vehicle power supply apparatus 10 that supplies electric power to a motor and to various electrical components. If the vehicle 30 is an automobile, the vehicle 30 may be any one of, for example, an electric vehicle (EV), a hybrid electric vehicle (HEV), and a plug-in hybrid electric vehicle (PHEV). The vehicle 30 includes the vehicle power supply apparatus 10 having a great electric storage function.

The vehicle 30 includes a vehicle body 31, the vehicle power supply apparatus 10 disposed in a battery area 32 (area where a battery is disposed) defined near a bottom 38 of the vehicle 30, a motor 23 (see FIG. 1B) to be driven by electric power supplied from the vehicle power supply apparatus 10, and tires (not illustrated) to be rotated by a driving force of the motor. The battery area 32 may be defined in an area other than the bottom 38. For example, the battery area 32 may be set behind rear seats.

As illustrated in FIG. 1B, the vehicle power supply apparatus 10 of this embodiment includes a battery 11 and a power control unit 15. For example, the battery 11 is either one of a lithium ion battery and a nickel metal hydride battery and includes a plurality of plate-shaped battery cells.

The power control unit 15 includes an inverter circuit that converts DC power supplied from the battery 11 into AC power having a predetermined frequency. The motor 23 is rotated by the AC power generated by the power control unit 15, thereby rotating the tires of the vehicle 30.

FIG. 2 is a block diagram illustrating the vehicle power supply apparatus 10. In the vehicle power supply apparatus 10, the battery 11 and the power control unit 15 are coupled together via a power supply line 14. The power supply line 14 includes a positive power supply line 12 coupled to a positive terminal of the battery 11, and a negative power supply line 13 coupled to a negative terminal of the battery 11.

A first main switch 16 is provided on the positive power supply line 12. A second main switch 17 is provided on the negative power supply line 13. When the first main switch 16 and the second main switch 17 are brought into conduction, DC power is supplied from the battery 11 to the power control unit 15. When the first main switch 16 and the second main switch 17 are interrupted, the DC power is not supplied from the battery 11 to the power control unit 15. Examples of the first main switch 16 and the second main switch 17 include a relay (system main relay). The relay can switch a high current with low control power. The same applies to other switches described later.

A bypass line 18 is formed between the positive power supply line 12 and the negative power supply line 13. A precharge resistor 19 and a resistor switch 20 are coupled together in series on the bypass line 18. The precharge resistor 19 is used for precharging and is coupled to the power control unit 15 via a precharge switch 24. The resistor switch 20 is operated for discharging the battery 11 by using the precharge resistor 19. Precharging refers to preparatory charging to be performed so that contacts are not fused due to a rush current flowing into the first main switch 16 and the second main switch 17 when the battery 11 and the power control unit 15 are coupled together to charge a capacitor near the power control unit.

A service plug 21 is provided on the negative power supply line 13. The service plug 21 can be brought into either one of a power supply state and an interrupted state. In the power supply state, electric power is supplied from the battery 11 to the power control unit 15. In the interrupted state, the supply of the electric power is interrupted. The power supply state and the interrupted state can be switched by shifting the service plug 21. For example, the power supply state and the interrupted state can be switched by sliding the service plug 21. The service plug 21 includes a discharge resistor 25. The discharge resistor 25 is not coupled to the negative power supply line 13 when the service plug 21 is in the power supply state. The discharge resistor 25 is coupled to the negative power supply line 13 when the service plug 21 is in the interrupted state. The service plug 21 further includes an NTC thermistor. As described later, a discharging operation circuit is switched when the resistance value of the NTC thermistor increases to a predetermined value or higher during discharging.

A power supply controller 22 is coupled to all the battery cells including the positive terminal and the negative terminal of the battery 11. The power supply controller 22 is referred to also as a battery control unit (BCU) and controls operations of the components of the vehicle power supply apparatus 10. The power supply controller 22 controls the conduction and the interruption of each switch described above.

Figure 3A:
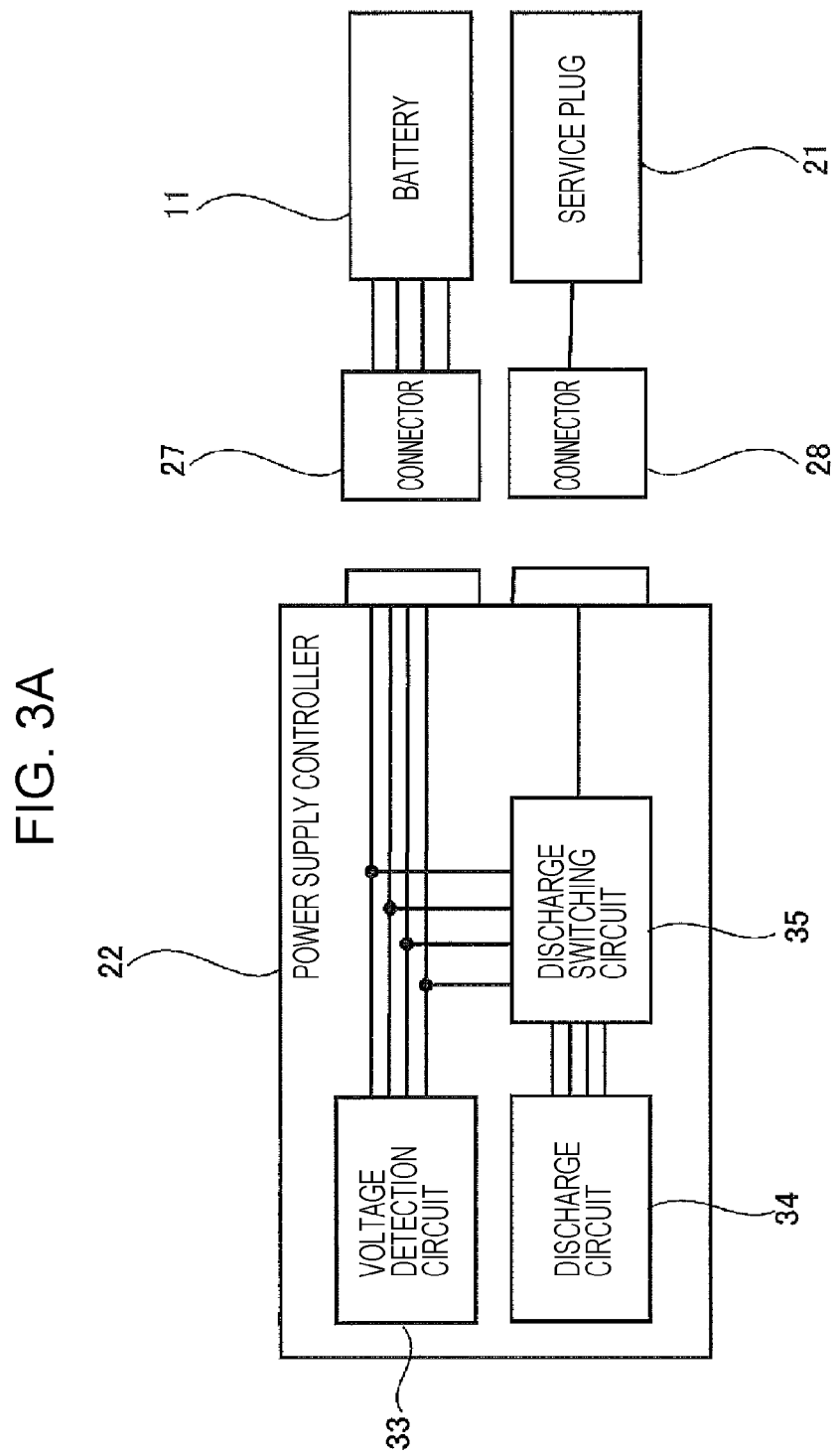

The power supply controller 22 and the service plug 21 are described in detail with reference to FIGS. 3A, 3B, and 3C. FIG. 3A is a block diagram illustrating details of the power supply controller 22. FIG. 3B is a schematic diagram illustrating the service plug 21 in the power supply state. FIG. 3C is a schematic diagram illustrating the service plug 21 in the interrupted state.

Referring to FIG. 3A, the power supply controller 22 includes a voltage detection circuit 33, a discharge circuit 34, and a discharge switching circuit 35. The power supply controller 22 is coupled to the battery 11 via a connector 27. The power supply controller 22 is coupled to the service plug 21 via a connector 28.

The voltage detection circuit 33 detects voltages of all the battery cells of the battery 11. As described later, the discharge switching circuit 35 switches routes of electric power based on either one of a discharge time of the battery 11 and a voltage change along with discharging. The discharge circuit 34 includes a resistor whose resistance value is lower than that of the precharge resistor 19 and additionally discharges the battery 11.

Referring to FIG. 3B, the service plug 21 includes a service plug base 37 and a service plug grip 36. The service plug grip 36 is slidably combined with the service plug base 37. FIG. 3B illustrates a state in which the vehicle travels normally, that is, the power supply state in which electric power is supplied from the battery 11 to the power control unit 15. A vehicle controller 26 is brought into conduction via an internal circuit of the service plug grip 36. The vehicle controller 26 is referred to also as an electric control unit (ECU).

FIG. 3C illustrates the service plug 21 in the interrupted state, that is, a discharging state. Transition is made from the traveling state illustrated in FIG. 3B to the discharging state illustrated in FIG. 3C by sliding the service plug grip 36 to the left on the drawing sheet. In the discharging state, the discharge resistor 25 (see FIG. 2) of the service plug 21 can be brought into conduction.

Figure 5:
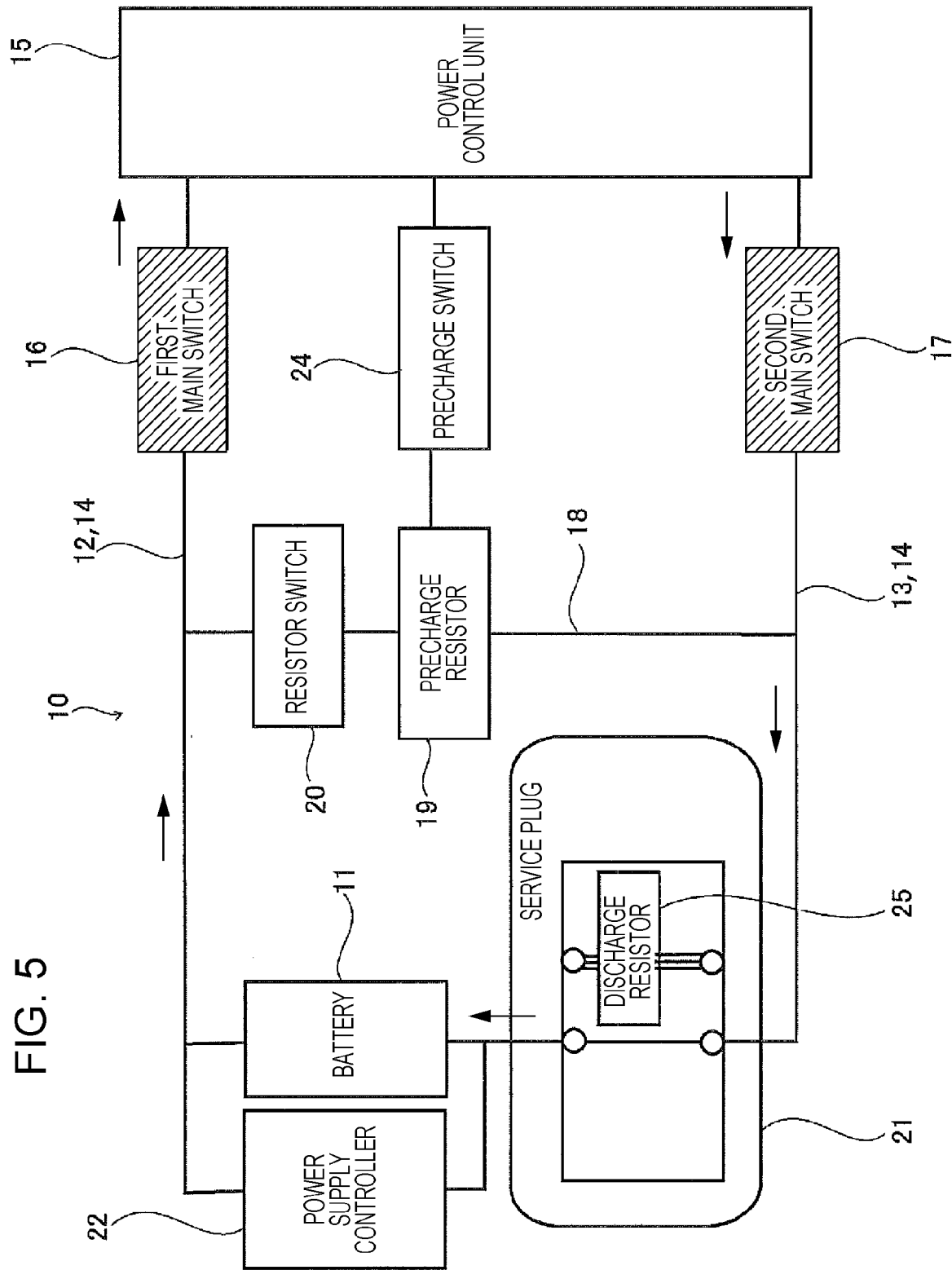
FIG. 5 is a circuit diagram illustrating a traveling state in the vehicle power supply apparatus according to the embodiment of the disclosure.
Figure 8B:
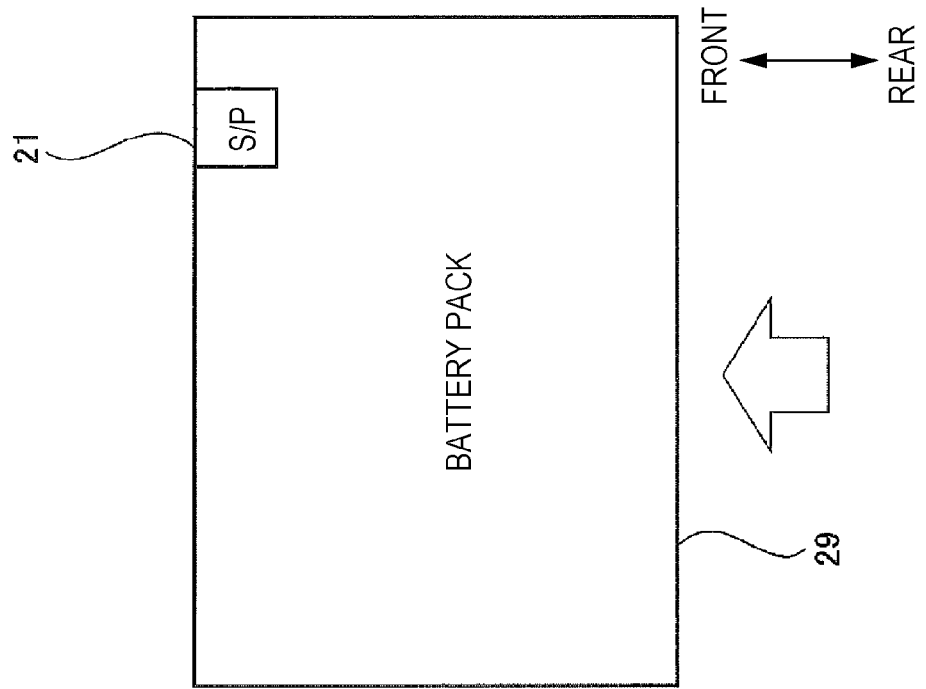
Figure 8A:
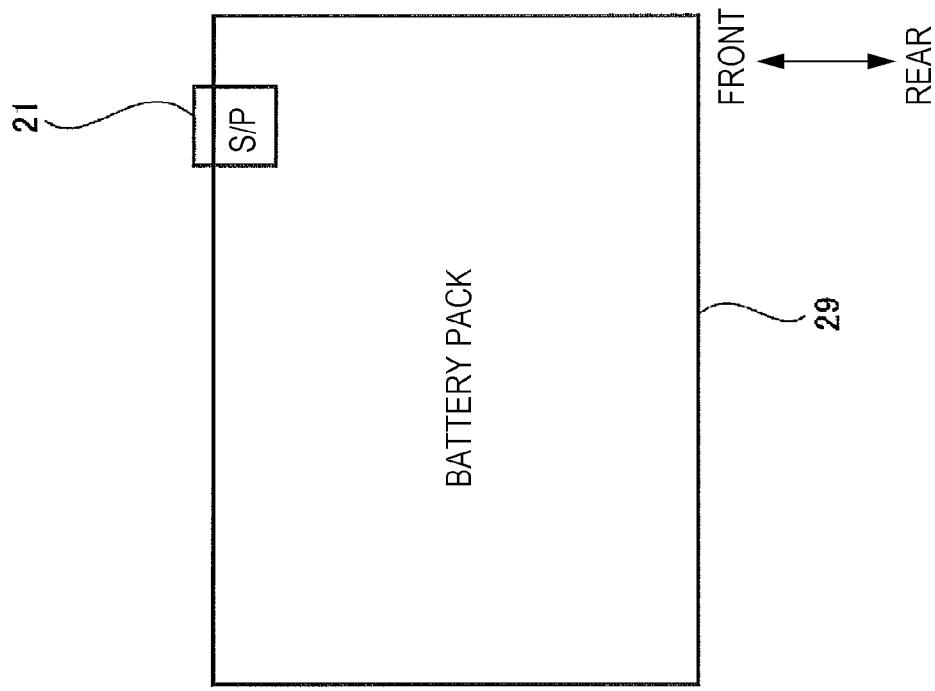
Figure 8C:
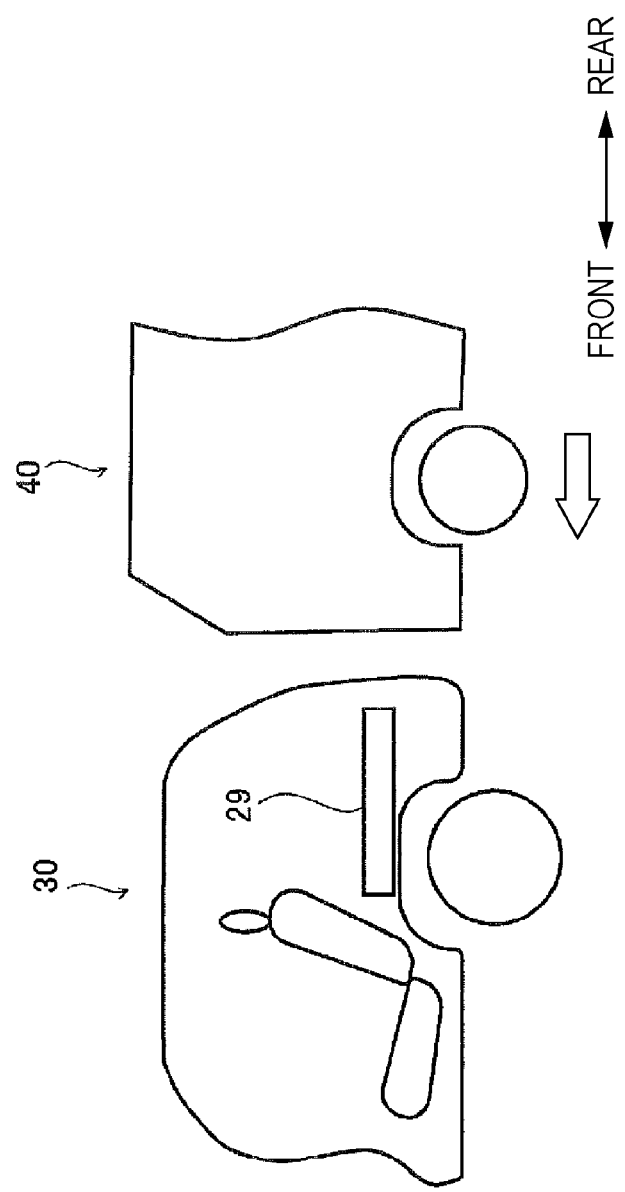

A method for discharging the battery 11 by using the vehicle power supply apparatus 10 of this embodiment is described with reference to FIG. 4 as well as FIGS. 5 to 8C and the figures referred to above. FIG. 4 is a flowchart illustrating the discharging method. FIG. 5 illustrates an operation of the vehicle power supply apparatus 10 in the normal traveling state (power supply state). FIG. 6 illustrates an operation of the vehicle power supply apparatus 10 in a first phase of discharging. FIG. 7 illustrates an operation of the vehicle power supply apparatus 10 in a second phase of discharging. FIGS. 8A, 8B, and 8C illustrate behavior of the service plug 21.

Referring to FIG. 5, in the normal traveling state (power supply state), DC power is supplied from the battery 11 to the power control unit 15 via the power supply line 14 including the positive power supply line 12 and the negative power supply line 13. The power control unit 15 converts the DC power into AC power having a predetermined frequency and supplies the AC power to the motor 23 illustrated in FIG. 1B.

In FIG. 5, switches in the conductive state are hatched and switches in the interrupted state are not hatched. The first main switch 16 and the second main switch 17 are in the conductive state and the resistor switch 20 and the precharge switch 24 are in the interrupted state. The same hatching rule applies to FIGS. 6 and 7. The service plug 21 is in the conductive state and does not interrupt the electric power flowing through the negative power supply line 13.

In Step S10, the service plug 21 is operated to make transition from the conductive state to the interrupted state. The service plug 21 may be operated by any one of an occupant, an operator, and a person who rescues the occupant. As described later, the service plug 21 may be shifted due to an impact of collision of the vehicle 30.

Referring to FIGS. 8A, 8B, and 8C, description is made of a method for operating the service plug 21 due to the impact of collision of the vehicle 30. FIG. 8A is a top view illustrating the structures of a battery pack 29 and the service plug 21 during traveling. FIG. 8B is a top view illustrating the battery pack 29 and the service plug 21 brought into the interrupted state (discharging state) in the event of collision. FIG. 8C is a side view illustrating the vehicle 30 in the event of collision.

As illustrated in FIG. 8A, the front end of the service plug 21 is located ahead of the front face of the battery pack 29 while the vehicle 30 is traveling. The service plug 21 makes transition from the conductive state to the interrupted state by being shifted in a fore-and-aft direction.

When another vehicle 40 collides with the vehicle 30 at the rear as illustrated in FIG. 8C, a force is applied to move the battery pack 29 forward.

Referring to FIG. 8B, the battery pack 29 moves forward and the service plug 21 is pushed into the battery pack 29 by being brought into contact with a part of a vehicle body component such as a seat back. Thus, the service plug 21 can make transition from the power supply state illustrated in FIG. 5 to the interrupted state illustrated in FIG. 6.

In Step S11, a 12V interlock circuit of the service plug 21 is interrupted and the discharge switching circuit 35 is brought into conduction. For example, the service plug 21 makes transition from the traveling state illustrated in FIG. 3B to the discharging state illustrated in FIG. 3C. In Step S12, signals indicating that the interlock circuit is interrupted and the discharge switching circuit is brought into conduction are input to the power supply controller 22 and the vehicle controller 26.

In Step S13, the first main switch 16 and the second main switch 17 are interrupted based on an instruction from the power supply controller 22 with reference to FIG. 6. In Step S14, the resistor switch 20 is brought into conduction based on an instruction from the power supply controller 22. The discharge resistor 25 of the service plug 21 is provided on the negative power supply line 13. In Step S15, the battery 11 is discharged by causing a current to pass through the precharge resistor 19 and the discharge resistor 25. In Step S15, the temperature of the service plug 21 increases and the temperature of the NTC thermistor of the service plug 21 increases as well. Thus, the resistance value decreases and the discharging advances.

In this embodiment, the battery 11 is discharged by using the precharge resistor 19 and the discharge resistor 25. The discharging may be advanced by causing the current to pass through the precharge resistor 19 alone. The discharging may also be advanced by causing the current to pass through the discharge resistor 25 alone.

In Step S16, the discharging is continued and the amount of the current passing through the precharge resistor 19 and the discharge resistor 25 decreases. Therefore, the temperature of the service plug 21 decreases. In Step S17, the temperature of the NTC thermistor decreases as well and the resistance value increases. Thus, the discharging of the battery 11 gradually becomes difficult.

In Step S18, the power supply controller 22 monitors the voltage of each battery cell of the battery 11 by the voltage detection circuit 33 illustrated in FIG. 3A and determines whether the voltage is lower than 2 V set as a threshold. When the voltage is lower than 2 V, that is, when Step S18 is "YES", the power supply controller 22 proceeds to Step S19. When the voltage is equal to or higher than 2 V, that is, when Step S18 is "NO", the power supply controller 22 returns to Step S15 to continue the discharging. In Step S19, the discharge switching circuit 35 of the power supply controller 22 also monitors the voltage of each battery cell of the battery 11. Thus, the accuracy of monitoring increases.

In Step S20, the power supply controller 22 switches the discharging operation circuit because the monitored voltage has become lower than the predetermined voltage. For example, the power supply controller 22 interrupts the first main switch 16, the second main switch 17, and the resistor switch 20 as illustrated in FIG. 7. Then, the power supply controller 22 causes the current to flow from the battery 11 to an internal resistor of the power supply controller 22. For example, the discharge switching circuit 35 of the power supply controller 22 causes the current to flow from the battery 11 to the discharge circuit 34 with reference to FIG. 3A.

The resistance value of the internal resistor of the power supply controller 22 is lower than a total resistance value of the precharge resistor 19 and the discharge resistor 25. Alternatively, the resistance value of the internal resistor of the power supply controller 22 is lower than the resistance value of each of the precharge resistor 19 and the discharge resistor 25. In Step S21, even though the voltage value of the battery 11 is lower than 2 V, the battery 11 can be discharged substantially completely by causing the current to flow from the battery 11 to the power supply controller 22.

In Step S20, the power supply controller 22 switches the discharging operation circuit when the voltage of each battery cell of the battery 11 is lower than the predetermined voltage but may switch the discharging operation circuit based on a discharge time. For example, the power supply controller 22 may monitor a period of time of discharging that uses the precharge resistor 19 and the discharge resistor 25 and may switch the discharging operation circuit when the discharge time is equal to or longer than a predetermined time. The power supply controller 22 may also monitor both the voltage and the discharge time and may switch the discharging operation circuit when the voltage is lower than the threshold and when the discharge time is equal to or longer than the predetermined time.

In Step S22, the battery 11 is demounted from the vehicle 30 and is discarded. If the battery 11 is discarded while the power supply controller 22 and the battery 11 are coupled together, the battery 11 is discharged after the discarding because the current flows from the battery 11 to the power supply controller 22. Thus, it is less likely that the voltage of the battery 11 recovers after the discarding. Accordingly, it is possible to improve the safety of the operator who handles the battery 11 after the discarding.

The embodiment of the disclosure is not limitative and modifications may be made without departing from the gist disclosed herein. The examples described above may be combined with each other.

The vehicle power supply apparatus according to the embodiment of the disclosure includes the battery, the power supply line including the positive power supply line and the negative power supply line, the power control unit coupled to the battery via the power supply line, the first main switch provided on the positive power supply line, the second main switch provided on the negative power supply line, the precharge resistor and the resistor switch coupled together in series on the bypass line that bypasses the positive power supply line and the negative power supply line, and the service plug provided on the power supply line and to be brought into either one of the power supply state in which electric power is supplied from the battery to the power control unit and the interrupted state in which the supply of the electric power is interrupted. When the service plug is brought into the interrupted state, the resistor switch is brought into conduction to cause the current to flow from the battery to the precharge resistor. In the vehicle power supply apparatus according to the embodiment of the disclosure, if the service plug is brought into the interrupted state when the battery is discarded or when a vehicle accident has occurred, the resistor switch is brought into conduction to cause the current to flow from the battery to the precharge resistor. Thus, the battery can be discharged without coupling the battery to dedicated battery discharging equipment.

In the vehicle power supply apparatus according to the embodiment of the disclosure, when the service plug is brought into the interrupted state, the current flows into the discharge resistor provided in the service plug. In the vehicle power supply apparatus according to the embodiment of the disclosure, the current flows into the discharge resistor provided in the service plug and therefore the overall resistance value of the discharging operation circuit can be increased during the discharging. Thus, the battery can be discharged more efficiently.

The vehicle power supply apparatus according to the embodiment of the disclosure further includes the power supply controller configured to control charging and discharging of the battery. When the period of time in which the current flows from the battery to the precharge resistor is equal to or longer than the predetermined period of time, the power supply controller interrupts the supply of the current from the battery to the precharge resistor and supplies the current from the battery to the power supply controller. In the vehicle power supply apparatus according to the embodiment of the disclosure, the battery can be discharged because the current flows from the battery to the power supply controller after the predetermined period of time has elapsed.

The vehicle power supply apparatus according to the embodiment of the disclosure further includes the power supply controller configured to control charging and discharging of the battery. When the voltage of the battery is lower than the predetermined voltage, the power supply controller interrupts the supply of the current from the battery to the precharge resistor and supplies the current from the battery to the power supply controller. In the vehicle power supply apparatus according to the embodiment of the disclosure, the battery can be discharged because the current flows from the battery to the power supply controller after the voltage of the battery has become lower than the predetermined voltage.

In the vehicle power supply apparatus according to the embodiment of the disclosure, the power supply controller is demountable from the vehicle together with the battery. In the vehicle power supply apparatus according to the embodiment of the disclosure, the battery can be discharged after the discarding because the power supply controller can be discarded by being demounted from the vehicle together with the battery.

In the vehicle power supply apparatus according to the embodiment of the disclosure, the service plug is mounted so that the service plug is shiftable in the fore-and-aft direction of the vehicle. In the vehicle power supply apparatus according to the embodiment of the disclosure, the service plug is shiftable in the fore-and-aft direction. When the vehicle comes into collision, the battery and the like move forward and the service plug is brought into the interrupted state. Thus, the battery can be discharged. Accordingly, the battery can be discharged without a manual operation when the vehicle comes into collision. Further, the battery can be discharged by manually applying an impact to the service plug by a mechanic during maintenance of the vehicle.

In the vehicle power supply apparatus according to the embodiment of the disclosure, each of the first main switch, the second main switch, and the resistor switch includes the relay. In the vehicle power supply apparatus according to the embodiment of the disclosure, each switch can be constructed with a simple structure.

The invention claimed is:

1. A vehicle power supply apparatus, comprising:
    a battery;
    a power supply line comprising a positive power supply line and a negative power supply line;
    a power control unit coupled to the battery via the power supply line;
    a first main switch disposed on the positive power supply line;
    a second main switch disposed on the negative power supply line;
    a precharge resistor and a resistor switch coupled together in series on a bypass line that bypasses the positive power supply line and the negative power supply line; and
    a service plug disposed on the power supply line and to be brought into either one of a power supply state in which electric power is supplied from the battery to the power control unit and an interrupted state in which the supply of the electric power is interrupted, wherein, when the service plug is brought into the interrupted state, the resistor switch is brought into conduction to cause a current to flow from the battery to the precharge resistor.

2. The vehicle power supply apparatus according to claim 1, wherein
the service plug comprises a discharge resistor, and
when the service plug is brought into the interrupted state, the current flows into the discharge resistor.

3. The vehicle power supply apparatus according to claim 2, further comprising a power supply controller configured to control charging and discharging of the battery,
wherein, when a period of time in which the current flows from the battery to the precharge resistor is equal to or longer than a predetermined period of time, the power supply controller interrupts supply of the current from the battery to the precharge resistor and supplies the current from the battery to the power supply controller.

4. The vehicle power supply apparatus according to claim 2, further comprising a power supply controller configured to control charging and discharging of the battery,
wherein, when a voltage of the battery is lower than a predetermined voltage, the power supply controller interrupts supply of the current from the battery to the precharge resistor and supplies the current from the battery to the power supply controller.

5. The vehicle power supply apparatus according to claim 2, wherein the service plug is mounted so that the service plug is shiftable in a fore-and-aft direction of the vehicle.

6. The vehicle power supply apparatus according claim 2, wherein each of the first main switch, the second main switch, and the resistor switch comprises a relay.

7. The vehicle power supply apparatus according to claim 1, further comprising a power supply controller configured to control charging and discharging of the battery,
wherein, when a period of time in which the current flows from the battery to the precharge resistor is equal to or longer than a predetermined period of time, the power supply controller interrupts supply of the current from the battery to the precharge resistor and supplies the current from the battery to the power supply controller.

8. The vehicle power supply apparatus according to claim 7, wherein the power supply controller is demountable from a vehicle together with the battery.

9. The vehicle power supply apparatus according to claim 8, wherein the service plug is mounted so that the service plug is shiftable in a fore-and-aft direction of the vehicle.

10. The vehicle power supply apparatus according to claim 7, wherein the service plug is mounted so that the service plug is shiftable in a fore-and-aft direction of the vehicle.

11. The vehicle power supply apparatus according claim 7, wherein each of the first main switch, the second main switch, and the resistor switch comprises a relay.

12. The vehicle power supply apparatus according claim 8, wherein each of the first main switch, the second main switch, and the resistor switch comprises a relay.

13. The vehicle power supply apparatus according to claim 1, further comprising a power supply controller configured to control charging and discharging of the battery,
wherein, when a voltage of the battery is lower than a predetermined voltage, the power supply controller interrupts supply of the current from the battery to the precharge resistor and supplies the current from the battery to the power supply controller.

14. The vehicle power supply apparatus according to claim 13, wherein the power supply controller is demountable from a vehicle together with the battery.

15. The vehicle power supply apparatus according to claim 13, wherein the service plug is mounted so that the service plug is shiftable in a fore-and-aft direction of the vehicle.

16. The vehicle power supply apparatus according claim 13, wherein each of the first main switch, the second main switch, and the resistor switch comprises a relay.

17. The vehicle power supply apparatus according to claim 1, wherein the service plug is mounted so that the service plug is shiftable in a fore-and-aft direction of the vehicle.

18. The vehicle power supply apparatus according claim 17, wherein each of the first main switch, the second main switch, and the resistor switch comprises a relay.

19. The vehicle power supply apparatus according to claim 1, wherein each of the first main switch, the second main switch, and the resistor switch comprises a relay.

* * * * *